United States Patent [19]

Leikauf

[11] Patent Number: 5,668,195
[45] Date of Patent: Sep. 16, 1997

[54] FLUIDIFYING AGENTS FOR CEMENTITIOUS COMPOSITIONS BASED RANDOM COPOLYMERS, COMPOSITIONS COMPRISING THE SAME, AND METHODS FOR THEIR USE

[75] Inventor: Bernhard Leikauf, Linn, Switzerland

[73] Assignee: MBT Holding AG, Zurich, Switzerland

[21] Appl. No.: 690,289

[22] Filed: Jul. 26, 1996

Related U.S. Application Data

[62] Division of Ser. No. 471,697, Jun. 6, 1995, which is a continuation of Ser. No. 360,160, Dec. 20, 1994, abandoned.

[30] Foreign Application Priority Data

Dec. 21, 1993 [GB] United Kingdom ............ 9326005
Dec. 21, 1993 [GB] United Kingdom ............ 9326046

[51] Int. Cl.$^6$ .................................................. C08K 3/00
[52] U.S. Cl. ........................................................ 524/5
[58] Field of Search ............................................. 524/5

[56] References Cited

U.S. PATENT DOCUMENTS

| | | | |
|---|---|---|---|
| 3,002,955 | 10/1961 | Sellers ................... | 525/327.7 |
| 3,563,930 | 2/1971 | Stram ..................... | 260/40 |
| 3,721,655 | 3/1973 | Schlumbom ............. | 260/78.5 |
| 5,104,926 | 4/1992 | Russel et al. ............ | 525/327.7 |
| 5,106,914 | 4/1992 | Russel et al. ............ | 525/327.7 |
| 5,158,996 | 10/1992 | Valenti .................... | 525/384 |
| 5,162,402 | 11/1992 | Ogawa et al. ........... | 524/5 |
| 5,364,541 | 11/1994 | Calcaterra et al. ...... | 525/327.7 |
| 5,395,895 | 3/1995 | Tagoshi et al. ......... | 525/384 |

FOREIGN PATENT DOCUMENTS

| | | |
|---|---|---|
| 595127 | 3/1960 | Canada . |
| 2671090A1 | 12/1990 | France . |
| 3514878A1 | 4/1985 | Germany . |
| 793070 | 4/1958 | United Kingdom . |
| 991908 | 5/1965 | United Kingdom . |
| 1267855 | 8/1969 | United Kingdom . |
| 1483691 | 12/1974 | United Kingdom . |
| 2164339 | 9/1984 | United Kingdom . |
| 2173805 | 3/1986 | United Kingdom . |
| WO91/09883 | 7/1991 | WIPO . |

OTHER PUBLICATIONS

Chemical Abstracts, vol. 106, No. 18, (Sep. 1986), "Cement Admixtures" (abstracting JP-A-61 197 455).

Primary Examiner—Joseph L. Schofer
Assistant Examiner—N. Sarofim
Attorney, Agent, or Firm—Carol A. Loeschorn; Andrew N. Parfomak

[57] ABSTRACT

A random copolymer corresponding to Formula I in free acid or salt form having the following types and numbers of monomer units;

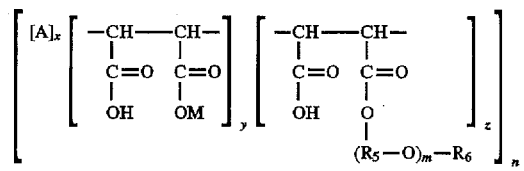

wherein A is selected from the moities (i) and (ii);

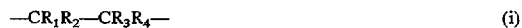

wherein $R_1$ and $R_3$ are selected from substituted benzene, $C_{1-8}$alkyl, $C_{2-8}$alkenyl, $C_{2-8}$alkylcarbonyl, $C_{1-8}$alkoxy, carboxyl and hydrogen, or $R_1$ and $R_3$ can together with $R_2$ and/or $R_4$ form a ring; and $R_2$ and $R_4$ are selected from hydrogen and $C_{1-4}$alkyl; and

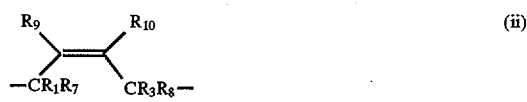

wherein $R_1$ and $R_3$ are as for (i) and $R_7$, $R_8$, $R_9$ and $R_{10}$ are individually selected from hydrogen and $C_{1-6}$alkyl, or $R_1$ and $R_3$ together with $R_7$ and/or $R_8$, $R_9$ and $R_{10}$ form a continuous $C_{2-8}$ hydrocarbon chain joining the carbon atoms to which they are attached, the hydrocarbon chain optionally comprising at least one hetero atom and the ring optionally having at least one anionic group, preferably sulphonic;

M is selected from hydrogen and the residue of a hydrophobic polyalkylene glycol or a polysiloxane, with the proviso that when A is (ii) and M is the residue of a hydrophobic polyalkylene glycol, M must be different from the group —$(R_5O)_mR_6$ $R_5$ is a $C_{2-8}$alkylene radical;

$R_6$ is selected from $C_{1-20}$alkyl, $C_{6-9}$cycloalkyl and phenyl;

n, x and z are numbers from 1 to 100;

y is 0 to 100;

m is 2 to 100; and the ratio of x to (y+z) is from 1:10 to 10:1 and the ratio of y:z is from 5:1 to 1:100. The copolymers are useful as fluidifying agents in cementitious compositions such as concrete and mortar.

6 Claims, No Drawings

FLUIDIFYING AGENTS FOR CEMENTITIOUS COMPOSITIONS BASED RANDOM COPOLYMERS, COMPOSITIONS COMPRISING THE SAME, AND METHODS FOR THEIR USE

This is a division of application Ser. No. 08/471,697, filed Jun. 6, 1995, which is a continuation of application Ser. No. 08/360,160, filed Dec. 20, 1994 abandoned.

This invention relates to novel copolymers which are useful as admixtures for cementitious mixes.

The invention provides a random copolymer corresponding to Formula I in free acid or salt form having the following types and numbers of monomer units;

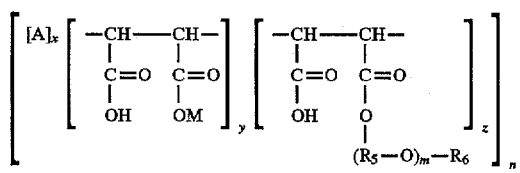

wherein A is selected from the moieties (i) and (ii)

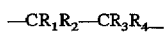

wherein $R_1$ and $R_3$ are selected from substituted benzene, $C_{1-8}$alkyl, $C_{2-8}$alkenyl, $C_{2-8}$alkylcarbonyl, $C_{1-8}$alkoxy, carboxyl and hydrogen, or $R_1$ and $R_3$ can together with $R_2$ and/or $R_4$ form a ring; and $R_2$ and $R_4$ are selected from hydrogen and $C_{1-4}$alkyl; and

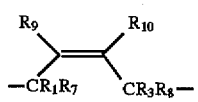

wherein $R_1$ and $R_3$ are as for (i) and $R_7$, $R_8$, $R_9$ and $R_{10}$ are individually selected from hydrogen and $C_{1-6}$alkyl, or $R_1$ and $R_3$ together with $R_7$ and/or $R_8$, $R_9$ and $R_{10}$ form a continuous $C_{2-8}$ hydrocarbon chain joining the carbon atoms to which they are attached, the hydrocarbon chain optionally comprising at least one hetero atom and the ring optionally having at least one anionic group, preferably sulphonic;

M is selected from hydrogen and the residue of a hydrophobic polyalkylene glycol or a polysiloxane, with the proviso that when A is (ii) and M is the residue of a hydrophobic polyalkylene glycol, M must be different from the group —$(R_5O)_m R_6$ $R_5$ is a $C_{2-8}$alkylene radical;

$R_6$ is selected from $C_{1-20}$alkyl, $C_{6-9}$cycloalkyl and phenyl;

n, x and z are numbers from 1 to 100;

y is 0 to 100;

m is 2 to 100; and the ratio of x to (y+z) is from 1:10 to 10:1 and the ratio of y:z is from 5:1 to 1:100.

In a preferred embodiment of the invention, when A is (i), $R_5$, $R_6$, y and z have the values hereinabove defined; $R_3$ and $R_2$ are hydrogen;

$R_1$ and $R_4$ are selected from hydrogen and $C_{1-4}$alkyl;

M is selected from residues of a hydrophobic polyalkylene glycol which is different to the group —$(R_5O)_m R_6$ and a polysiloxane;

n and x are 1–100; and the ratio of x to (y+z) is from 1:3–3:1; more preferably from 1:1 to 2:1.

In a further preferred embodiment of the invention, when A is (ii), $R_1$ and $R_3$ are selected from hydrogen, $C_{1-8}$alkyl and $C_{1-8}$alkoxy, $R_7$, $R_8$, $R_9$ and $R_{10}$ have the values hereinabove defined and the ratio of x to (y+z) is from 1:3–3:1.

It is possible and often desirable to incorporate more than one type of monomer unit (i) or (ii) into the copolymer. The preparation of such copolymers is well within the skill of the art.

The copolymers of this invention preferably have a weight-average (Mw) molecular weight from 5,000 to 100,000, more preferably from 8,000 to 30,000. In addition, there is preferably an even distribution of maleic acid half ester units and other monomer units, i.e. the ratio of x to (y+z) most preferably 1:1.

In formula I, any alkyl or alkylene groups may be linear or branched and each radical $R_5$, independently, is preferably a $C_{2-3}$ alkylene group, most preferably each $R_5$ is the same and is ethylene. Each $R_6$ independently, is preferably $C_{1-2}$alkyl, more preferably all groups $R_6$ are methyl. m preferably is a number from 7 to 20, most preferably 10–15.

Where monomer units comprising groups COOM are present, M is preferably the residue of a copolymer consisting of units derived from ethylene oxide and propylene oxide or the residue of a polysiloxane consisting of di-$C_{1-4}$alkylsiloxane units. The ethylene oxide/propylene oxide copolymers may be represented by formula II

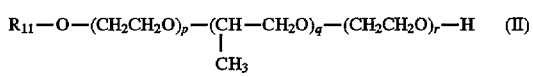

in which $R_{11}$ is hydrogen or has, independently, the same meaning as $R_6$ above, and p, q and r are numbers from 0 to 100 with the provisos that at least one of p, q, and r is at least 1, and that q>p+r. Preferred polysiloxanes correspond to formula III

in which q is a number from 1 to 100.

Alternatively, M is the residue of a polypropylene glycol having from 10 to 200 units derived from propylene oxide.

In order to have the necessary molecular weight, the copolymers of the invention contain at least 12, preferably from 18 to 40 units of formula I, i.e. n is preferably a number from 18 to 40. This means that the sum of m+n preferably is a number from 25 to 60. The acid groups of the copolymers of formula I may be in free acid or salt form. These salts may be alkali, alkaline earth, ferrous, aluminium, (alkanol)ammonium or (alkyl)ammonium salts. Preferably these copolymers are in the form of alkali metal salts, particularly sodium salts.

Organic copolymers according to formula I may be produced by methods well known in the art. For example, a copolymer in which A is (i) may be prepared by reacting a random copolymer of the following composition

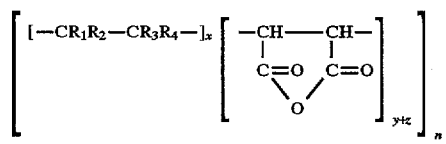

with a compound of formula IV

as well as with compounds of formula II or III in the appropriate amounts when it is desired that M should be other than hydrogen, and optionally reacting the resulting copolymer with an alkali or alkaline earth base, with ferrous or aluminium salts or with ammonia, an (alkanol)amino or an (alkyl)amino compound. A copolymer in which A is (ii) may be produced by methods well known in the art for example, by including a diene in the monomer mixture. Depending on the amounts used, the reaction of the maleic acid anhydride groups in the copolymer I with compounds of formula II or III and formula IV may be substantially complete, or there may remain in the final polymer a number of anhydride groups which will form dicarboxylic acid groups in aqueous solution. A 100% transformation which theoretically can be obtained with equimolar amounts of the reactants will, of course, never be achieved. Preferably almost all units of maleic anhydride in the copolymer are transformed into half-ester units, which can be measured by determination of the acid number of the obtained copolymer.

Copolymers of the type described hereinabove are obtained by copolymerization of desired monomer and maleic acid anhydride. Polymers of this general type are well known and are described for example in C. E. Schildknecht, "Vinyl and Related Polymers" John Wiley and Sons, Inc., New York, 1952.

Preferred examples of comonomers which may be copolymerised with maleic anhydride to give a random copolymer of the type hereinabove described include allyl monomers, for example, allyl acetate, allyl benzene, 2-allyl phenol, 3-allyl cyclopentane, allyl alcohol and derivatives, allyl ethers, allyl tactones and allyl polyglycol ethers;

vinyl alkyl monomers, for example; methyl, ethyl and butyl(alkyl) vinylether, 1,2-dimethoxyethylene, benzyl and phenyl vinyl ether, vinyl alkylthioethers and N-carbazolylethyl vinyl ether;

vinyl esters, for example, vinyl acetate and isopropenyl acetate;

cyclic ethers, for example, p-dioxene, 2,3-dihydropyran, furan, alkyl furan, 2,3-dihydrofuran, benzofuran, thiophene and 4-methyl-1,3-dioxolane;

divinyl monomers, for example, divinyl ether, cis-propenyl vinyl ether, cis-dipropenyl ether, divinyl sulphone, divinyl dimethylsilane and diethyleneglycol dimethyl ether;

olefins, for example, all $C_{1-18}$ olefins, whether linear, branched or cyclic; and conjugated dienes, for example, butadiene, isoprene, norbornene, 1,3-pentadiene, 1,3-cyclopentadiene, 2,4-hexadiene and 2,4-cyclohexadiene.

Alternatively, the copolymers may be prepared by polymerising monomers which have the desired groups already present. This method is generally less satisfactory than the initial preparation and subsequent modification of a copolymer with anhydride rings.

Polyalkylene glycols of formula II or IV are well-known compounds and may be obtained by addition of alkylene oxides, especially ethylene oxide and propylene oxide, to alkyl- or cycloalkylalcohols or phenols, or by polyaddition of the alkylene oxides.

The polysiloxanes of formula III are also well-known compounds and may be obtained, for example, by the polycondensation of dichlorodimethylsilane with chlorotrimethylsilane and water.

The copolymers according to formula I are excellent surfactants and may be used to disperse organic and inorganic materials. In particular, they may be used as additives for cementitious mixes.

Cementitious mixes, in which the organic copolymers of the invention may be used as additives, are mortars, grouts and concretes. The hydraulic binder may be Portland cement, alumina cement or blended cement, for example, pozzolanic cement, slag cement or other types, Portland cement being preferred.

The copolymers of the invention are added in amounts of from 0.01 to 10%, preferably from 0.1 to 3% by weight based on the weight of the cement. In such amounts, the organic copolymers of the invention have the property of fluidifying the cementitious mixes to which they have been added and are therefore excellent superplasticizers. They have the additional advantage of having a degree of air entraining properties which is lower than those of similar copolymers. The invention therefore provides a cementitious composition fluidifying agent comprising a copolymer as hereinabove described. The invention further provides a cementitious composition comprising a copolymer as hereinabove described. The invention further provides a method of fluidifying a cementitious composition comprising the incorporation therein of a copolymer as hereinabove described.

Further admixtures conventional in cement technology, for example, set accelerators or retarders, frost protection agents, pigments, etc. may also be present in the cementitious mixes of the invention.

The following examples, in which all parts, ratios and percentages are by weight and all temperatures are expressed in degrees Centigrade, illustrate the invention. In all examples, the polyethylene glycol(polyglycol) of molecular weight 500 is poly(ethylene glycol)monomethyl ether—suitable commercially-available materials include M 500 (Hoechst) and MPEG 500 (Dow). The molecular weights for the polymers in the Examples are weight-average molecular weights (Mw), measured by GPC with polystyrene sulfonate calibration.

EXAMPLE 1

(a) Preparation of polymer 49 parts of maleic anhydride is dissolved in 100 parts of toluene. This solution is raised to 90° C. and a mixture of 36 parts ethyl vinyl ether, 2 parts azodiisobutyronitrile (AIBN) initiator and 2 parts dodecyl mercaptan are added over a period of 60 minutes. 230 parts of poly(ethylene glycol) Of molecular weight 500 is then added, the temperature is increased to 140° C. and solvent is removed. After 3 hours, the mixture is cooled to 80° C. and it is diluted with water and neutralized with 60 parts of 30% sodium hydroxide solution. Mw=9500.

(b) Addition to cement 0.3% by weight of cement of the polymer solids hereinabove prepared is dissolved in 35 parts water and the solution is added to 100 parts Portland cement and 300 parts of DIN standard sand. The resulting mixture is mixed according to DIN EN 196 Part 1 after which the flow is determined according to DIN 18555. The flow is 24 cm. A cementitious composition prepared as described but without the polymer has a flow of 13 cm.

EXAMPLE 2

Example 1 is repeated with a molar equivalent quantity of the following monomers substituted for the ethyl vinyl ether:

(a) butyl vinyl ether;
(b) poly(ethylene glycol)allyl ether;
(c) 1-methyl propene.

For the polymer prepared from monomer (a), Mw=4500 and for the polymer prepared from monomer (b), Mw=7000.

The resulting polymers are added to cement as described in Example 1 and they give excellent flow.

EXAMPLE 3

(a) Preparation of polymer 49 parts of maleic anhydride is dissolved in 150 parts of methyl isobutyl ketone and the temperature is raised to 80° C. A mixture of 36 parts furan and 2 parts benzoyl peroxide is then added over a period of 60 minutes. The solvent is removed by distillation and the product vacuum-dried.

200 parts of poly(ethylene glycol) of molecular weight 500 is mixed with the dried product and the mixture heated to 140° C. and maintained at that temperature for 3 hours. The temperature is then reduced to 80° C. and the product is diluted with 300 parts of water and neutralized with 60 parts 30% sodium hydroxide solution. Mw=3000.

(b) Use in cement 0.3% solids by weight of cement of the polymer hereinabove prepared is dissolved in 35 parts water and the solution is added to 100 parts Portland cement and 300 parts DIN standard sand. The resulting mixture is mixed according to DIN EN 196 Part 1 after which the flow is determined as a function of time according to DIN 18555. The flow is 22 cm. An identical composition lacking the copolymer has a flow of 13 cm.

EXAMPLE 4

Example 3 is repeated, substituting a molar equivalent quantity of thiophene for the furan. A cement composition including the resulting polymer, prepared as described in Example 1(b), has a good flow. Mw=7500.

EXAMPLE 5

60 parts of allyl acetate is mixed with 50 parts of maleic acid in 200 parts of benzene. A solution of 5 parts of benzoyl peroxide (5%) in 50 parts of benzene is added very slowly to the heated solution (60° C.). After 6 hours reaction time, the solvent is removed and the solid is dispersed in 200 parts of polyglycol (molecular weight 500). After heating up to 140° C., there remains a viscous liquid which is soluble in water. The liquid is diluted with water to 20% weight solids and the pH is adjusted to about 7 with 55 parts of sodium hydroxide. Mw=40,000.

EXAMPLE 6

50 parts of 2,3-dihydropyrane is mixed in chloroform with 50 parts of maleic anhydride. 2.5 parts (2.5%) of benzoyl peroxide is added to the mix and the solution is heated on a water bath up to 60° C. After eight hours, 250 parts of polyglycol (molecular weight 500) is added to the solution and the temperature is raised to 130° C. After the distillation of the solvent (2 hours) the mix is poured into sufficient water to give a 20% weight solution and the pH is adjusted to approx. 7 with 58 parts of sodium hydroxide.

EXAMPLE 7

50 parts of maleic acid is dissolved in 300 parts of toluene and heated up to 120° C. Butadiene is bubbled through the solution and 5 parts of AIBN in 20 parts toluene is added very slowly to the mix (over 1 hour). Three hours later, 200 parts of polyglycol (molecular weight 500) is added to the mixture and the solvent is evaporated. The mixture is mixed with 200 parts of water and neutralized with 55 parts of sodium hydroxide. MW=8000.

EXAMPLE 8

50 parts of isoprene and 50 parts of maleic anhydride are mixed in 400 parts of cyclohexanone with 2 parts of t-butyl peroxypivalate and the mixture held at 80° C. for 5 hours. 200 parts of polyglycol (molecular weight 500) is then added and the mixture is then heated up to 130° C. After 4 hours, the solvent is removed under reduced pressure. Water and sodium hydroxide are added to adjust the pH to 7. Mw=12,000.

EXAMPLE 9

50 parts of 1,3-cyclooctadiene and 50 parts of maleic anhydride are dissolved in acetic anhydride with 2.5 parts of AIBN and are heated to 50° C. for 24 hours. 300 parts of polyglycol is then added to the mix and the solvent is removed at reduced pressure. The mix is heated up to 130° C. for 2 hours and then diluted in water to 20% weight solution and pH is brought to approx. 7 with 75 parts of sodium hydroxide. Mw=4000.

What is claimed is:

1. A cementitious composition fluidifying agent comprising a random copolymer corresponding to Formula I in free acid or salt form having the following types and numbers of monomer units:

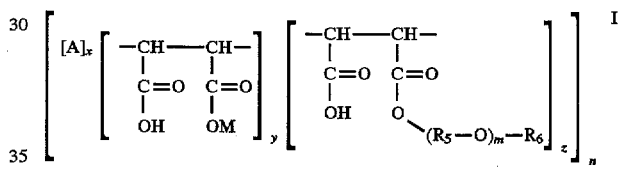

wherein:

A is selected from the moieties (i) and (ii);

wherein:

$R_1$ and $R_3$ are selected from $C_{1-8}$ alkyl, $C_{2-8}$ alkenyl, $C_{2-8}$ alkylcarbonyl, $C_{1-8}$ alkoxy, carboxyl and hydrogen, or $R_1$ and $R_3$ can together with $R_2$ and/or $R_4$ form a ring; and $R_2$ and $R_4$ are selected from hydrogen and $C_{1-4}$ alkyl; and,

wherein:

$R_1$ and $R_3$ are as for (i) and $R_7$, $R_8$, $R_9$ and $R_{10}$ are individually selected from hydrogen and $C_{1-6}$ alkyl, or $R_1$ and $R_3$ together with $R_7$ and/or $R_8$, $R_9$ and $R_{10}$ from a continuous $C_{2-8}$ hydrocarbon chain joining the carbon atoms to which they are attached, the hydrocarbon chain optionally comprising at least one hetero atom and the ring optionally having at least one anionic group;

M is selected from hydrogen and the residue of a hydrophobic polyalkylene glycol or a polysiloxane, with the proviso that when A is (ii) and M is the residue of a hydrophobic polyalkylene glycol, M must be different from the group $-(R_5O)_mR_6$ $R_5$ is a $C_{2-8}$ alkylene radical;

$R_6$ is selected from $C_{1-20}$ alkyl, $C_{6-9}$ cycloalkyl and phenyl;

n, x and z are numbers from 1 to 100;

y is 0 to 100;

m is 2 to 100; and the ratio of x to (y+z) is from 1:10 to 10:1 and the ratio of y:z is front 5:1 to 1:100.

2. A cementitious composition fluidifying agent according to claim 1 wherein the fluidifying agent comprises a sulfonic group.

3. A cementitious composition comprising a random copolymer corresponding to Formula I in free acid or salt form having the following types and numbers of monomer units:

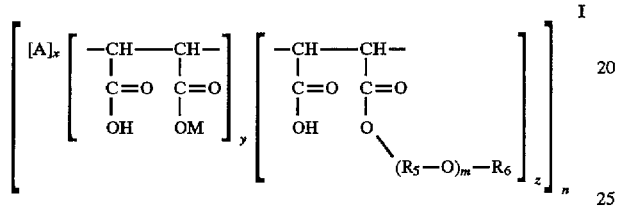

wherein:

A is selected from the moieties (i) and (ii);

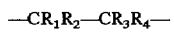 (i)

wherein:

$R_1$ and $R_3$ are selected from $C_{1-8}$ alkyl, $C_{2-8}$ alkenyl, $C_{2-8}$ alkylcarbonyl, $C_{1-8}$ alkoxy, carboxyl and hydrogen, or $R_1$ and $R_3$ can together with $R_2$ and/or $R_4$ form a ring; and $R_2$ and $R_4$ are selected from hydrogen and $C_{1-4}$ alkyl; and,

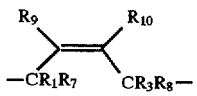 (ii)

wherein:

$R_1$ and $R_3$ are as for (i) and $R_7$, $R_8$, $R_9$ and $R_{10}$ are individually selected from hydrogen and $C_{1-6}$ alkyl, or $R_1$ and $R_3$ together with $R_7$ and/or $R_8$, $R_9$ and $R_{10}$ from a continuous $C_{2-8}$ hydrocarbon chain joining the carbon atoms to which they are attached, the hydrocarbon chain optionally comprising at least one hetero atom and the ring optionally having at least one anionic group;

M is selected from hydrogen and the residue of a hydrophobic polyalkylene glycol or a polysiloxane, with the proviso that when A is (ii) and M is the residue of a hydrophobic polyalkylene glycol, M must be different from the group —$(R_5O)_mR_6$ $R_5$ is a $C_{2-8}$ alkylene radical;

$R_6$ is selected from $C_{1-20}$ alkyl, $C_{6-9}$ cycloalkyl and phenyl;

n, x and z are numbers from 1 to 100;

y is 0 to 100;

m is 2 to 100; and the ratio of x to (y+z) is from 1:10 to 10:1 and the ratio of y:z is from 5:1 to 1:100.

4. A cementitious composition according to claim 3 wherein the random copolymer comprises a sulfonic group.

5. A method of fluidifying a cementitious composition comprising the steps of incorporating into said cementitious composition a random copolymer corresponding to Formula I in free acid or salt form having the following types and numbers of monomer units:

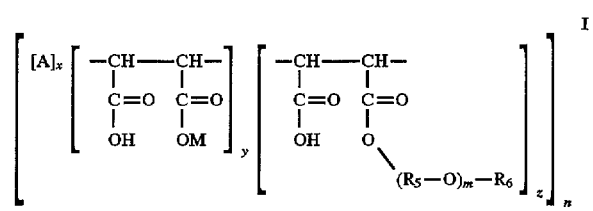

wherein:

A is selected from the moieties (i) and (ii);

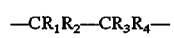 (i)

wherein:

$R_1$ and $R_3$ are selected from $C_{1-8}$ alkyl, $C_{2-8}$ alkenyl, $C_{2-8}$ alkylcarbonyl, $C_{1-8}$ alkoxy, carboxyl and hydrogen, or $R_1$ and $R_3$ can together with $R_2$ and/or $R_4$ form a ring; and $R_2$ and $R_4$ are selected from hydrogen and $C_{1-4}$ alkyl; and,

 (ii)

wherein:

$R_1$ and $R_3$ are as for (i) and $R_7$, $R_8$, $R_9$ and $R_{10}$ are individually selected from hydrogen and $C_{1-6}$ alkyl, or $R_1$ and $R_3$ together with $R_7$ and/or $R_8$, $R_9$ and $R_{10}$ from a continuous $C_{2-8}$ hydrocarbon chain joining the carbon atoms to which they are attached, the hydrocarbon chain optionally comprising at least one hetero atom and the ring optionally having at least one anionic group;

M is selected from hydrogen and the residue of a hydrophobic polyalkylene glycol or a polysiloxane, with the proviso that when A is (ii) and M is the residue of a hydrophobic polyalkylene glycol, M must be different from the group —$(R_5O)_mR_6$ $R_5$ is a $C_{2-8}$ alkylene radical;

$R_6$ is selected from $C_{1-20}$ alkyl, $C_{6-9}$ cycloalkyl and phenyl;

n, x and z are numbers from 1 to 100;

y is 0 to 100;

m is 2 to 100; and the ratio of x to (y+z) is from 1:10 to 1.0:1 and the ratio of y:z is from 5:1 to 1:100.

6. A method of fluidifying a cementitious composition according to claim 5 wherein the random copolymer comprises a sulfonic group.

* * * * *